Oct. 19, 1954  J. J. PACEY  2,691,955
VISIBLE DISCHARGE INDICATOR
Filed Sept. 29, 1953  2 Sheets-Sheet 1

INVENTOR
JOHN J. PACEY
BY Chapin & Neal.
ATTORNEYS

Oct. 19, 1954            J. J. PACEY            2,691,955
                  VISIBLE DISCHARGE INDICATOR
Filed Sept. 29, 1953                      2 Sheets-Sheet 2

INVENTOR
JOHN J. PACEY
BY Chapin & Neal
ATTORNEYS

Patented Oct. 19, 1954

2,691,955

UNITED STATES PATENT OFFICE 2,691,955

VISIBLE DISCHARGE INDICATOR

John J. Pacey, Springfield, Mass., assignor to Gilbert & Barker Manufacturing Company, West Springfield, Mass., a corporation of Massachusetts Application September 29, 1953, Serial No. 382,896

2 Claims. (Cl. 116—117)

This invention relates to improvements in visible discharge indicators for indicating through a window in a conduit whether or not the liquid therein is in motion.

The invention, while capable of general application, finds one advantageous use in connection with liquid measuring and dispensing apparatus, such as is commonly used at service stations for dispensing gasoline and the like.

In gasoline dispensing apparatus, the Weights and Measures authorities require that there be a visible indicator, in the nature of a sight glass or window, in the dispensing conduit at its highest point for the purpose of showing the customer that the dispensing conduit is completely full of liquid and free of all air. It is also required that there be in such sight glass some movable element, actuated by flow of liquid in the dispensing conduit, to indicate to the customer that the liquid is in motion. It has been common to employ for this purpose a spinner rotatably mounted within a glass dome and actuated by the flow of liquid. However, such a spinner, when operated at the high speeds presently employed in dispensing gasoline, will appear merely as a blur and will not give to the customer as clear an indication of flow as is desirable. To overcome this objection, it has been proposed to use one or more balls in the glass dome actuated by the flow of liquid. These balls, by their irregular motion within the glass dome, are readily visible to the purchaser regardless of the speed at which the liquid flows in the dispensing conduit.

This invention has for its object the provision of an improved visible discharge indicator of the type having a movable ball and is characterized in that the ball, which is heavier than the liquid, is confined in the space between a dome-shaped window or glass cup and a confronting spinning cup, is moved into and out of the spinning cup, gravitating into the spinning cup which slings the ball outwardly against the glass cup from which it rebounds into the spinning cup.

The invention also has for an object the provision of a visible discharge indicator of the type described, which is adapted for operation from a remote location and need not be positioned directly in the main path of flow of the liquid.

The invention also has for an object the provision of a visible discharge indicator of the movable-ball type having simplified and improved mechanical structure adapting it for improved operation as well as for manufacture at relatively low cost.

The invention will be disclosed with reference to the one illustrative embodiment of it shown in the accompanying drawings, in which, Fig. 1 is a small-scale sectional elevational view of a gasoline dispensing pump embodying the invention;

Figure 1:
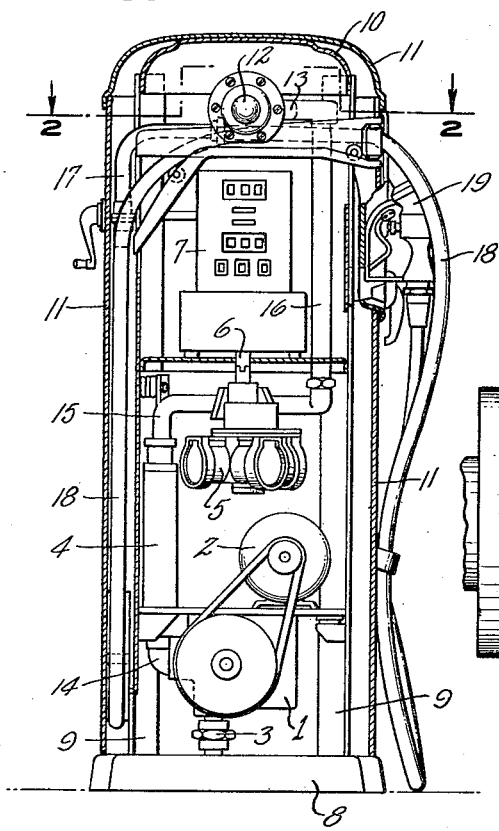

In these drawings; the invention has been shown in an embodiment adapted for use in gasoline dispensing apparatus. One example of such apparatus is shown in Fig. 1. The apparatus includes a suitable pump 1, which is driven by an electric motor 2 and draws up liquid through a suction pipe 3 and forces it outwardly through a delivery conduit. Interposed in this conduit are an air separator 4 and a meter 5 which measures the liquid dispensed. The meter drives through a shaft 6 a suitable registering mechanism 7 for indicating the amount, as in quantity and cost, of the liquid dispensed. These various elements are all suitably supported from a frame which in this case consists of a base 8, upstanding columns 9, and a cap 10, connecting the upper ends of the columns. These elements and the frame are enclosed by a suitable housing 11, which has suitable windows in its front and rear walls, through which the dials of the registering mechanism 7 are visible. Above each such window is one of the visible discharge indicators of this invention, each being indicated generally at 12. These indicators are mounted on a casing 13, which has passages forming part of the aforesaid liquid dispensing conduit. In addition, this conduit includes a pipe 14 connecting pump 1 and separator 4, a pipe 15 connecting the latter to a meter 5, a pipe 16 connecting the meter to the inlet of casing 13, a pipe 17 connected to the outlet of the latter, and a flexible delivery hose 18 connected to the outlet end of pipe 17 and extending through and outside the housing 11, terminating with the usual valved nozzle 19.

Figure 5:
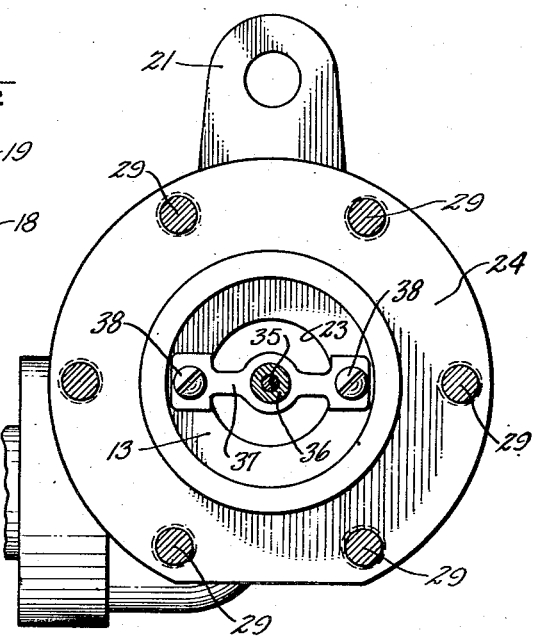
Fig. 5 is a cross sectional view taken on the line 5—5 of Fig. 4.
Figure 2:
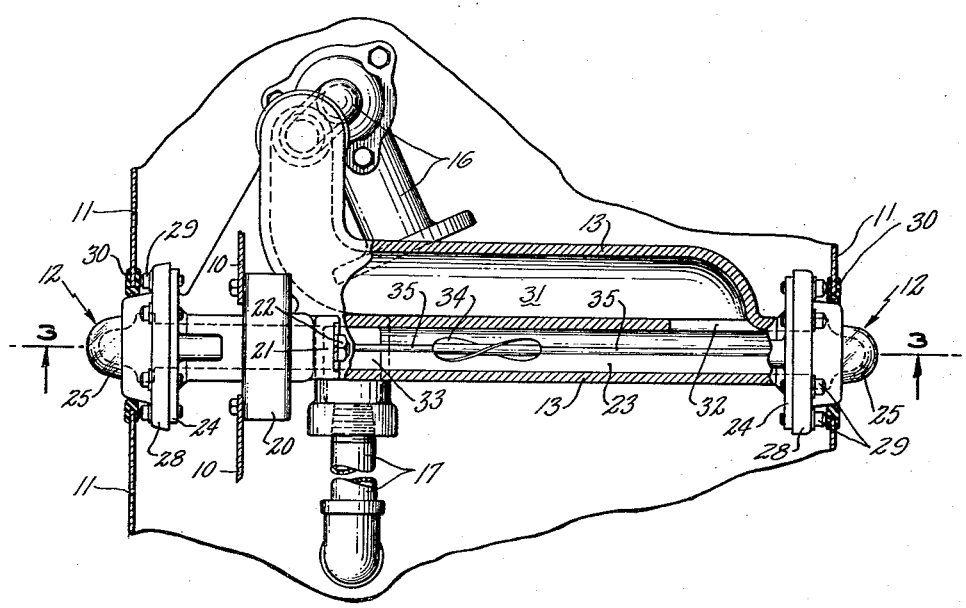
Fig. 2 is a fragmentary sectional plan view taken on the line 2—2 of Fig. 1 and drawn to a larger scale.
Figure 3:
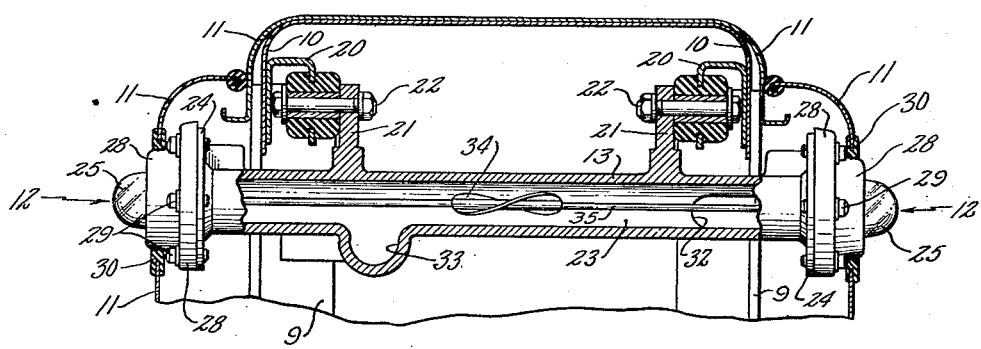
Fig. 3 is a fragmentary sectional elevational view taken on the line 3—3 of Fig. 2.

As shown in Figs. 2 and 3, the casing 13 extends across the interior of housing 11 near the upper end thereof and is suitably supported from the frame of the housing, as by hangers 20 which are fixed to the downturned rim of cap 10 and to each of which an upstanding lug 21 on casing 13 is secured by a bolt 22. The casing 13 has a straight passage 23, extending longitudinally and entirely therethrough, terminating with circular end flanges 24. Each end of passage 23 is closed by a cup 25 of glass or other suitable transparent material. Each cup (Fig. 4) has a circumferential flange 26, which is clamped between gaskets 27 to an end of casing 13 by means of a ring 28, secured by screws 29 to the flange 24 of casing 13. The glass cups 25 thus close both ends of passage 23 and these cups protrude, as shown in Figs. 2 and 3 through the walls of housing 11, a grommet 30 of rubber-like material engaging the periphery of each clamping ring 28 to seal the joint. The casing 13 also has formed therein a passage 31, one end of which connects with the pipe 16 and the other end of which connects with passage 23 by way of an opening 32. Passage 23 also has an outlet 33 connecting with pipe 17. The inlet and outlet to passage 23 are spaced a substantial distance from the cup-shaped windows 25. Located in passage 23 between the inlet 32 and outlet 33 (Fig. 3) is a propeller 34, which is fixed to a shaft 35 extending longitudinally through passage 23 and is adapted to be rotated by the flow of liquid through such passage. This shaft 35 actuates the visible discharge indicators. This shaft is rotatably supported near its ends by similar means, one thereof being shown in Figs. 4 and 5. A bearing 36 which receives the shaft, is fixed centrally to a bridge 37, which spans diametrically across the passage 23 and is fixed at its ends by screws 38 to casing 13.

Figure 4:
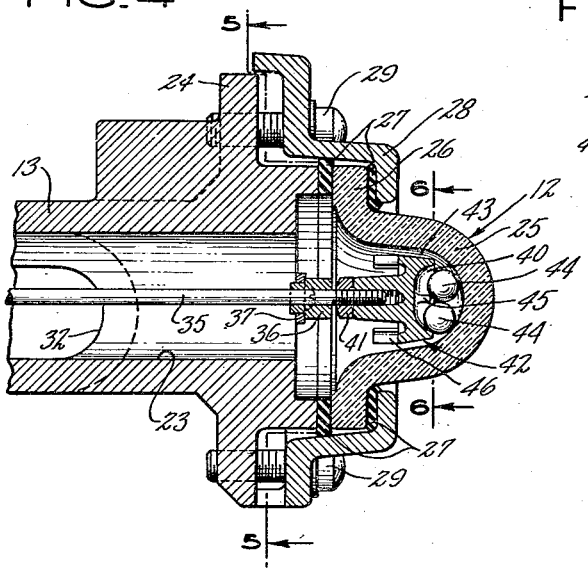
Fig. 4 is a sectional elevational view of one of the visible discharge indicators.
Figure 6:
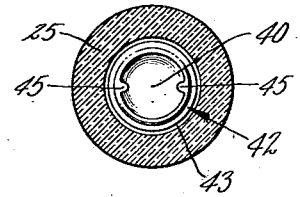
Fig. 6 is a cross sectional view taken on the line 6—6 of Fig. 4.

The visible discharge indicators are alike in construction and therefore only one of them will be described and with special reference to Fig. 4. The indicator includes a rotatable cup 40 adjustably fixed, as by the screw threads shown, to an end of shaft 35 and held in adjusted position by a lock nut 41. This cup 40 is located within the stationary glass cup 25 in coaxial and confronting relation. The rim 42 of cup 40 is separated from the wall of cup 25, which surrounds it, by an annular space 43 of small radial dimension. Located in the space between the cups 25 and 40 are one or more balls 44. As shown, two are used. Where two balls are employed, they may be made of different colors and in this case, one ball is green and the other yellow. Each ball has a specific gravity somewhat greater than the liquid that flows in passage 23 so that it will sink in the liquid and may therefore fall by gravity into the spinning cup such as shown in Fig. 4. The diameter of each ball is greater than the radial dimension of space 43 so that the balls are confined between the two confronting cups. Each rotatable cup 40 may, and preferably does, have one or more (two as shown in Fig. 6) of projections 45, which extend radially from its curved inner surface and are intended to lift the balls 44 when the cup is moving relatively slowly. Also, each cup 40 may, and preferably does, have fixed to its back face a plurality of vanes 46, which stir the liquid and tend to keep it moving in the outer ends of passage 23.

In normal operation, the liquid dispensing conduit, including the passages 23 and 31, the inlet 32 and the outlet 33 of casing 13, will be completely filled with liquid. The balls 44 and 45, having a specific gravity somewhat greater than that of the liquid dispensed, will sink in the liquid, gravitating into positions, such as are shown in Fig. 4, wherein one of them is partly engaged with the interior surface of the spinning cup 40. When the nozzle 19 of the dispensing hose 18 is opened after the pump 1 has been started, liquid will flow through the dispensing conduit and, in passing through the passage 23, will turn the propeller 34, its shaft 35 and the cups 40. Each cup 40 rotates rapidly and will move the ball engaged therewith and sling it outwardly by centrifugal force against the interior of the glass cup or dome 25 from which it rebounds and lodges in the cup 40 to again be moved thereby. Where, as here, the axis of the cup is horizontal the ball will be lifted as it is turned but the lifting is not essential and the cups may rotate about otherwise disposed axes if desired. As the ball 44 moves out of its illustrated position to move through the described cycle, the other ball 45 will move downwardly by gravity and engage the spinning cup to be moved thereby in the same manner as described in connection with ball 44. Thus, the balls are successively and repeatedly moved up and down and back and forth in the space between the confronting cups. The action will be somewhat irregular as the paths of the balls will vary but the irregularity of the action contributes to the desired result of an easily discernible indication of the liquid flow. The spinner, frequently used heretofore, because of its very regularity appears merely as a blur, whenever it turns at high speeds and does not furnish an indication of flow that is as readily discerned as the present one. The impingement of the balls on the interior surface of the glass cup will keep the latter clean and free from deposits of sediment. The balls, of course, are made of material, which will not abrade the glass, and which in the present example, is a phenolic resin. When the flow through the dispensing conduit is throttled down sufficiently by partial closure of nozzle 19, the speed of cups 40 may drop so low that the centrifugal force will be insufficient to move the balls as described. Then the projections 45 come into play, each engaging a ball and moving it with the rotary cup until it tumbles back into the bottom of the space between the cups to be subsequently moved in the same manner.

The indicators described have the advantage that they may be operated from a remote location and at speeds proportional to the rate of flow of liquid through the dispensing conduit without causing all the liquid dispensed to pass through the chambers of the indicators. As will be clear from Fig. 3, the main flow of liquid in the passage 23 is from the inlet opening 32 to the outlet opening 33 and the rotor 34, being located in this part of the passage, will be turned at speeds proportional to the rate of flow through this part of the passage. The speed of shaft 35 for any given rate of flow in passage 23 will vary according to the design of the propeller and the extent of the clearance space between the propeller and the peripheral wall of passage 23. However, the ends of this passage 23 are filled with liquid which is not in rapid motion. The movement of the cups 40 will tend somewhat to circulate the liquid but the use of the vanes 46 is desirable in order to insure enough circulation in such ends to cause any air that may be trapped therein to be forced outwardly and carried away with the liquid. It will be clear that the indicators may be actuated effectively to indicate flow without passing all the liquid dispensed to pass through the chambers of the indicator as has been common heretofore.

The structure disclosed provides a simple but very effective means for moving the balls in proportion to the rate of liquid flow in order to produce an indication of flow that is readily seen by a customer from any side as well as from the front of the glass window 25. The casing 13 is a simple casting that requires finishing at opposite ends to form seats for the bridge 37 and the flange 26 of glass cup 25. The spinning cups 40 may be formed by die casting. They are desirably chrome plated and polished. All the parts are readily assembled in the casing 13. One bridge 37 with its attached bearing 36 is fixed by screws 38 in one end of casing 13. Then the shaft 35 with rotor 34, fixed thereon, is thrust through passage 23 and one end is thrust through this bearing 36. Then the other bearing 36 is placed on the other end of shaft 34 and the bridge 37 attached to this bearing is fixed in place by the screws 38. The spinning cups 40 are then placed on the ends of shaft 34 moved into the desired positions of axial adjustment and fixed in such positions by tightening the lock nuts 41. Then, the glass domes 25 with their gaskets are put in place and held by the rings 28 and screws 29. The indicator structure is thus simple and easy to make and it offers a simple but very effective way of actuating the balls 44 and 45 to indicate flow.

What is claimed is:

1. A visible discharge indicator, comprising, a casing having a passage for liquid with an inlet thereto and an outlet therefrom and having a transparent cup the central portion of which forms a window, a second cup rotatably mounted within the first cup and located with its concavity confronting the concavity of the fixed cup and its rim spaced from the adjacent wall of the fixed cup, means in said passage operable by the flow of liquid therethrough for rotating the second cup, and a ball having a specific gravity greater than that of the liquid and a diameter greater than the space between said rim and wall and located within the concavities of the confronting cups, said ball gravitating into engagement with the rotating cup and being thrown outwardly thereby against the stationary cup and subsequently rebounding into engagement with the rotating cup.

2. The combination, as claimed in claim 1, in which projections extend inwardly from the rim of the second cup at angularly-spaced positions thereon, whereby the second cup when rotating at low speeds may move the ball and cause it to tumble into the first cup and then rebound into the second cup.

References Cited in the file of this patent
UNITED STATES PATENTS

| Number | Name | Date |
|---|---|---|
| 2,147,309 | Moore | Feb. 14, 1939 |
| 2,549,276 | Wolfe | Apr. 17, 1951 |